(No Model.)

A. F. ROCKWELL.
ANIMAL TRAP.

No. 474,303. Patented May 3, 1892.

Witness
Louis G. Julihn
Eric G. Julihn

Inventor
A. F. Rockwell.
by Hopkins & Atkins.
Attorneys

UNITED STATES PATENT OFFICE.

ALBERT F. ROCKWELL, OF BRISTOL, CONNECTICUT.

ANIMAL-TRAP.

SPECIFICATION forming part of Letters Patent No. 474,303, dated May 3, 1892.

Application filed January 4, 1892. Serial No. 416,990. (No model.)

*To all whom it may concern:*

Be it known that I, ALBERT F. ROCKWELL, of Bristol, county of Hartford, and State of Connecticut, have invented certain new and useful Improvements in Animal-Traps, of which the following is a specification, reference being had to the accompanying drawings.

My improvements relate to that class of animal-traps known as "jaw-traps," and their object is to produce an improved trap of this class in which a single bent wire constitutes the springs and base of the trap.

Figure 1:
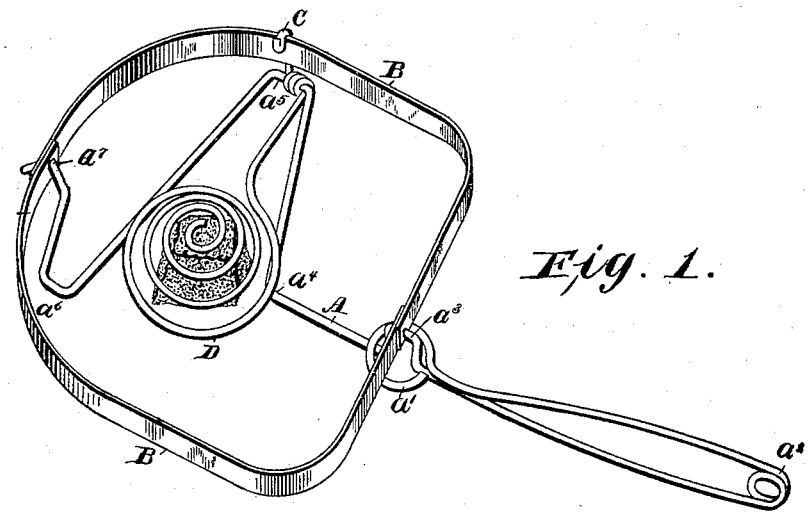
Figure 2:
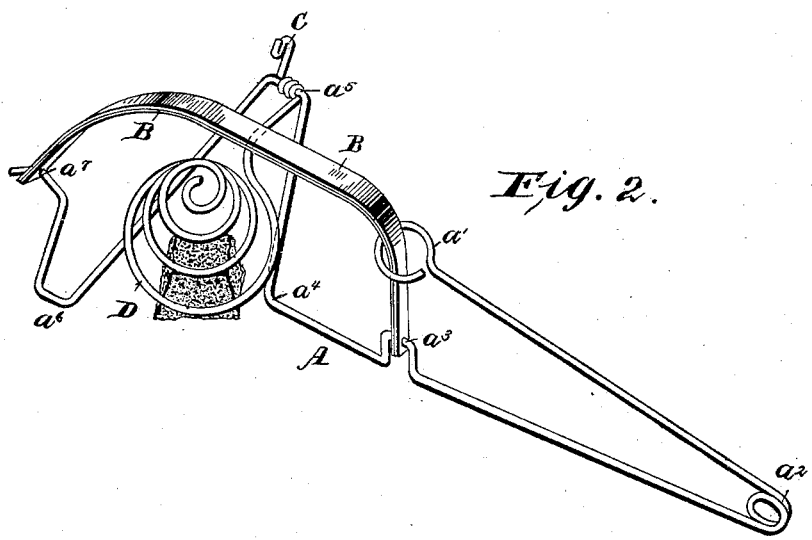

In the accompanying drawings, Figure 1 is a perspective view showing the trap set, and Fig. 2 is another perspective view showing the strap sprung.

Referring to the letters upon the drawings, A indicates a resilient wire, which may be of any desired size or required degree of resilient strength to suit the particular purposes for which the trap may be made. This wire is bent at $a'$, $a^2$, $a^3$, $a^4$, $a^5$, $a^6$, and $a^7$ to form the curves and angles illustrated to constitute the springs and frame of the trap. The bends or angles at $a^3$ and $a^7$ form the pivots for the jaws B, and the bend at $a^5$ forms the pivot for the combined latch C and bait-holder D, composed of a single wire bent at $d$, $d'$, $d^2$, and $d^3$, as illustrated, to form the bait-holder, the pivot-eye, and the jaw-latch. I thus form a trap of two pieces of bent wire and two jaws, which may be of metal plate bent to the proper form.

The bait is represented at E in the center of the trap and is placed under the bait-holder, so that to get at it and spring the trap the animal must lift the holder upward, which will release the latch and cause the springs to close the jaws and secure the game in the usual way.

This construction forms a very simple and effective trap that may be cheaply manufactured.

What I claim is—

1. In a jaw-trap, the combination, with the jaws, of a base and springs composed of a single bent wire that forms the pivot of the jaws, which are made of parts separate from it, substantially as set forth.

2. In a jaw-trap, the combination, with the jaws, of a base and springs composed of a single bent wire that forms the pivot of the jaws, which are made of parts separate from it, and a combined bait-holder and latch pivoted to the base at $a^5$, substantially as set forth.

3. In a jaw-trap, the combination, with the base, of a bait-holder and jaw-latch formed of a single piece of wire pivoted to the base, substantially as set forth.

In testimony of all which I have hereunto subscribed my name.

ALBERT F. ROCKWELL.

Witnesses:
SETH W. BEEBE,
C. A. PARSONS.